(12) United States Patent
Sorin et al.

(10) Patent No.: US 9,331,782 B2
(45) Date of Patent: May 3, 2016

(54) OPTICAL TRANSMISSION SYSTEM

(75) Inventors: Wayne V. Sorin, Mountain View, CA (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/118,743

(22) PCT Filed: May 23, 2011

(86) PCT No.: PCT/US2011/037546
§ 371 (c)(1),
(2), (4) Date: Nov. 19, 2013

(87) PCT Pub. No.: WO2012/161689
PCT Pub. Date: Nov. 29, 2012

(65) Prior Publication Data
US 2014/0099120 A1    Apr. 10, 2014

(51) Int. Cl.
| G02B 6/28 | (2006.01) |
| G02B 6/24 | (2006.01) |
| H04B 10/25 | (2013.01) |
| G02B 27/12 | (2006.01) |
| G02B 27/14 | (2006.01) |
| H04B 10/80 | (2013.01) |
| G02B 6/42 | (2006.01) |
| H04J 14/02 | (2006.01) |

(52) U.S. Cl.
CPC .......... H04B 10/2504 (2013.01); G02B 6/4206 (2013.01); G02B 6/4249 (2013.01); G02B 27/123 (2013.01); G02B 27/145 (2013.01); H04B 10/801 (2013.01); H04J 14/02 (2013.01)

(58) Field of Classification Search
CPC ........... H04B 10/2504; G02B 27/1086; G02B 27/145; G02B 27/123
USPC ....................................... 398/79, 43
See application file for complete search history.

(56) References Cited

U.S. PATENT DOCUMENTS

| 5,377,287 A | 12/1994 | Lee et al. |
| 5,694,246 A * | 12/1997 | Aoyama et al. ............... 359/619 |
| 5,790,310 A | 8/1998 | Huang |
| 5,970,190 A * | 10/1999 | Fu ...................... G02B 6/12007 385/37 |

(Continued)

FOREIGN PATENT DOCUMENTS

| CN | 1906511 A | 1/2007 |
| CN | 101266325 A | 9/2008 |

(Continued)

OTHER PUBLICATIONS

Supplementary Partial European Search Report, Nov. 12, 2014, European Patent Application No. 11866034.9, 6 pages.

(Continued)

*Primary Examiner* — Oommen Jacob
(74) *Attorney, Agent, or Firm* — Fabian VanCott

(57) ABSTRACT

An optical transmission system includes a lens wafer to couple light into an optical transmission medium. The lens wafer includes a set of collimating lenses on a first side of the lens wafer, the collimating lenses to collimate beams of light from a plurality of light sources. The lens wafer also includes a focusing element on a second side of the wafer opposing the first side. The focusing element is to focus the collimated beams of light into an optical transmission medium.

18 Claims, 7 Drawing Sheets

(56) References Cited

U.S. PATENT DOCUMENTS

| | | | |
|---|---|---|---|
| 6,057,899 A | 5/2000 | Tanaka et al. | |
| 6,122,417 A * | 9/2000 | Jayaraman et al. | 385/24 |
| 6,353,502 B1 * | 3/2002 | Marchant | G02B 3/005 |
| | | | 359/619 |
| 6,400,513 B1 * | 6/2002 | Southwell | G02B 6/425 |
| | | | 359/618 |
| 6,591,035 B2 * | 7/2003 | Miller et al. | 385/24 |
| 6,718,088 B2 | 4/2004 | Okazaki et al. | |
| 6,870,976 B2 | 3/2005 | Chen et al. | |
| 6,879,749 B2 | 4/2005 | Wong et al. | |
| 7,068,885 B2 | 6/2006 | Bidnyk et al. | |
| 7,076,129 B2 * | 7/2006 | Lemoff | 385/24 |
| 7,198,416 B2 | 4/2007 | Ray et al. | |
| 2002/0018298 A1 | 2/2002 | Miller et al. | |
| 2003/0086636 A1 | 5/2003 | Kang et al. | |
| 2004/0101247 A1 | 5/2004 | Chen et al. | |
| 2005/0069013 A1 | 3/2005 | Bhandarkar et al. | |
| 2005/0129404 A1 * | 6/2005 | Kim | G02B 6/12019 |
| | | | 398/84 |
| 2006/0039655 A1 | 2/2006 | Wilson | |
| 2006/0088072 A1 | 4/2006 | Hayakawa et al. | |
| 2006/0165351 A1 | 7/2006 | Hamanaka et al. | |
| 2009/0202244 A1 | 8/2009 | Jin et al. | |
| 2011/0158278 A1 * | 6/2011 | Koch | G02B 6/4204 |
| | | | 372/45.012 |

FOREIGN PATENT DOCUMENTS

| | | |
|---|---|---|
| EP | 1300705 A2 | 4/2003 |
| EP | 2226661 A1 | 9/2010 |
| KR | 10-0540700 B1 | 1/2006 |
| KR | 1020100008761 A | 1/2010 |
| WO | WO-0186848 A1 | 11/2001 |
| WO | WO-03003071 A2 | 1/2003 |
| WO | WO-03003071 A3 | 1/2003 |
| WO | WO-2008005872 A2 | 1/2008 |

OTHER PUBLICATIONS

PCT International Search Report, Korean IPO, Dec. 26, 2011. PCT Patent Application No. PCT/US2011/037546.

Strzelecka, E.M., et al.; "Monolithic Integration of an Array of Multiple-wavelength Vertical-cavity Lasers with a Refractive Microlens for Optical Interconnections"; Nov. 18-21, 1996; pp. 271-272; vol. 2; http://ieeexplore.ieee.org/xpl/freeabs_all.jsp?arnumber=571656.

Supplementary European Search Report, Mar. 20, 2015, European Patent Application No. 11866034.9, 6 pages.

* cited by examiner

OPTICAL TRANSMISSION SYSTEM

BACKGROUND

Optical communication systems are often used to transmit data in a variety of systems such as telecommunication systems and data communication systems. Telecommunication systems often involve the transmission of data over geographic distances ranging from a few miles to thousands of miles. Data communications often involve transmission of data throughout a datacenter. Such systems involve the transmission of data over distances ranging from a few feet to several hundred feet. The coupling components that are used to transfer an electrical signal into an optical signal and put that optical signal into an optical transmission medium such as a fiber optic cable are relatively costly. Due to this expense, optical transmission systems are generally used as a backbone of a network to transfer large amounts of data over greater distances.

The use of optical transmission systems in computer communication systems would benefit from the high bandwidth provided by such optical systems. Bandwidth refers to the amount of data that can be transmitted within a specified unit of time. However, computer communication systems typically involve the transmission of data over smaller distances that range from a few inches to several feet. Thus, it is often not economically practical to use the more expensive optical coupling components to optically transmit data over such small distances.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
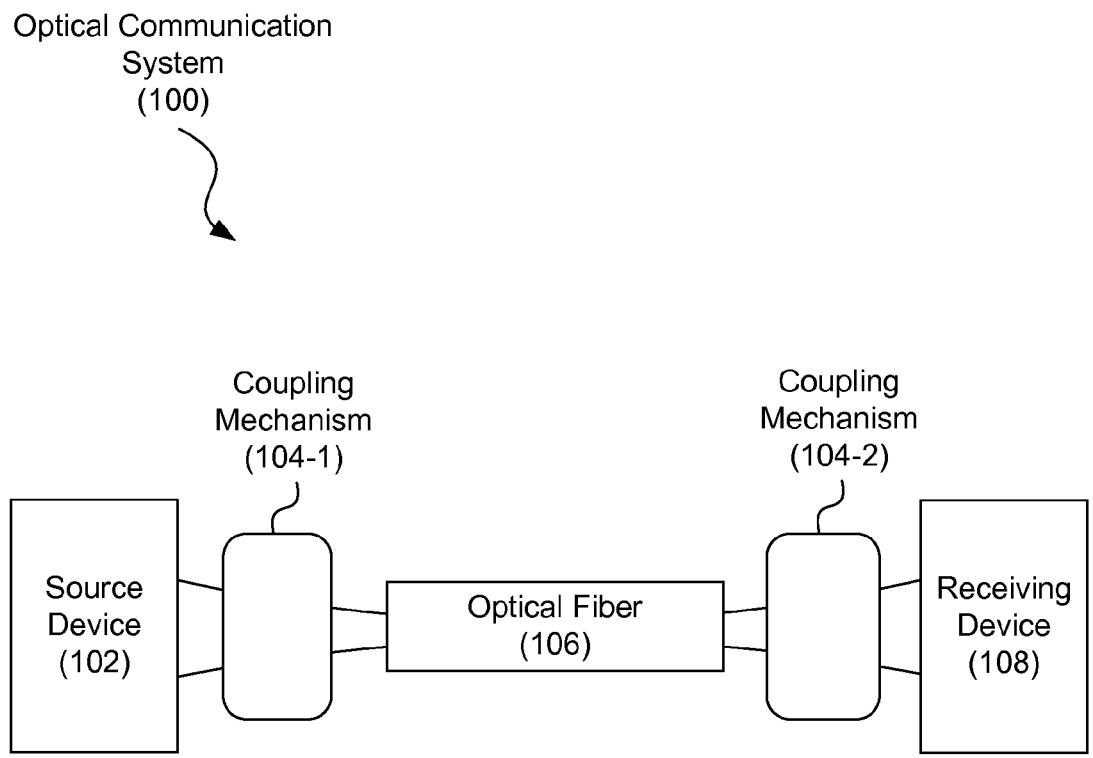
FIG. 1 is a diagram showing an illustrative optical communication system, according to one example of principles described herein.

As mentioned above, the use of optical communication in computer systems would provide for the high bandwidth provided by such optical data transmission. However, computer communication systems typically involve the transmission of data over smaller distances that range from a few inches to several feet. Thus, it is often not economically practical to use the more expensive optical coupling components to optically transmit data over such small distances.

In light of this and other issues, the present specification discloses methods and systems for coupling light into an optical transmission medium such as an optical fiber in a cost effective manner. By reducing the costs of these coupling components, computer communication systems that involve the transmission of data over smaller distances will be able to more cost effectively take advantage of the high bandwidth provided by optical systems.

According to certain illustrative examples, the coupling components include a coupling element formed onto a lens wafer. A lens wafer is a transparent substrate onto which arrays of lenses may be formed in a batch process. A batch process refers to a process that forms many similar components onto a single substrate often referred to as a wafer. The wafer may then be further diced up into smaller units, each unit including one or more of the similar components formed onto the wafer. Such processing is more cost efficient then producing each component separately.

A coupling element formed onto a lens wafer includes a set of collimating lenses on one side of the lens wafer and a focusing element on the opposing side of the lens wafer. The collimating lenses are formed such that they collimate beams of light received from an array of light sources. The array of light sources may be an array of Vertical Cavity Surface Emitting Lasers (VCSELs). VCSELs are lasers that project light perpendicular to a semiconductor substrate. The semiconductor substrate having the VCSELs formed thereon may also be produced in a batch process. Each collimating lens of the coupling element may receive a beam of light from a different VCSEL. Each of the VCSEL's projecting light onto a single coupling element may produce a different wavelength of light. Each different wavelength of light may be used as a separate channel of data.

The focusing element on the opposing side of the lens wafer is formed such that it will focus the collimated beams of light from each of the collimating lenses into an optical fiber. The collimated beams of light from each of the collimating lenses can be a different wavelength. Thus, the coupling element acts as a multiplexer. A multiplexer is a device that places several channels of data onto a single transmission line. Here, the coupling element is placing several wavelengths of light into the same optical transmission medium. A demultiplexer is then used at the other end of the transmission line to separate the channels of data so they can be processed separately.

Through use of methods and systems embodying principles described herein, coupling components can be produced at a lower cost. This lower cost is due in part to the batch processing of multiple coupling elements onto a single lens wafer. The lower cost coupling components makes optical communication methods more suitable for computer communication applications where the optical signal travels a relatively short distance.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included in at least that one example, but not necessarily in other examples.

Referring now to the figures, FIG. 1 is a diagram showing an illustrative optical communication system. According to certain illustrative examples, an optical communication system includes a source device (102), coupling mechanisms (104), an optical fiber (106), and a receiving device (108).

A source device (102) is an optical transmitter that projects a beam of light capable of being modulated so as to transmit data. A source device (102) may convert an electrical signal into an optical signal by using the electrical signal to modulate a light source. A common light source used in optical communication technology is a laser. One type of laser that can be used is a VCSEL.

A VCSEL is a laser that projects light perpendicular to the plane of a semiconductor substrate. A semiconductor substrate may include a two dimensional array of VCSELs. Each VCSEL may be modulated by a different electrical signal and thus each VCSEL within the array can transmit an optical signal carrying a different channel of data. In order to transmit the optical signals through light produced by the VCSELs, the light is focused by a coupling mechanism (104-1) into an optical fiber (106).

An optical fiber (106) is a medium that is designed to provide for the propagation of light. An optical fiber (106) may bend and the light will still travel through from one end of the fiber to the other. An optical fiber (106) typically includes two different types of material. The core of the fiber is typically a transparent material. A transparent cladding material is formed around the core of the fiber. The cladding material has an index of refraction that is slightly less than the index of refraction of the core material. This causes light that is projected into the core to bounce off the sides of the core towards the center of the core. Thus, the light will propagate down the entire length of the optical fiber (106) and emerge at the other end.

In order to get the light to propagate through the optical fiber appropriately, the characteristics of the light and the manner in which that light is focused by the coupling mechanism (104-1) are specifically designed according to the characteristics of the optical fiber (106). An optical fiber may be either a single mode fiber or a multi-mode fiber. A single mode fiber allows for one mode of propagation while a multi-mode fiber allows for multiple propagation modes. A propagation mode refers to a spatial shape of the light that propagates unperturbed along the waveguide.

Several models can be used to describe the behavior of light propagating through an optical waveguide. According to the ray optics model, a mode corresponds to an angle at which the light ray travels down the waveguide. Thus, there is a discrete set of angles at which light enters into a multi-mode fiber in order for that light to propagate through the waveguide and maintain its spatial shape. As will be described in more detail below, the coupling mechanism can multiplex several beams from different light sources into a multi-mode optical fiber such that the different beams can be efficiently coupled and will propagate simultaneously through the optical fiber.

When light propagating through the optical fiber (106) reaches the opposite end, a coupling mechanism (104-2) will focus the light onto a receiving device (108) such as a detector. A detector may convert a received optical signal into an electrical signal by generating an electrical signal according to the received optical signal. As will be described in more detail below, the coupling mechanism (104-2) can act as a demultiplexer and separate the multiple wavelengths of light so that they are received by different detectors.

Figure 2:
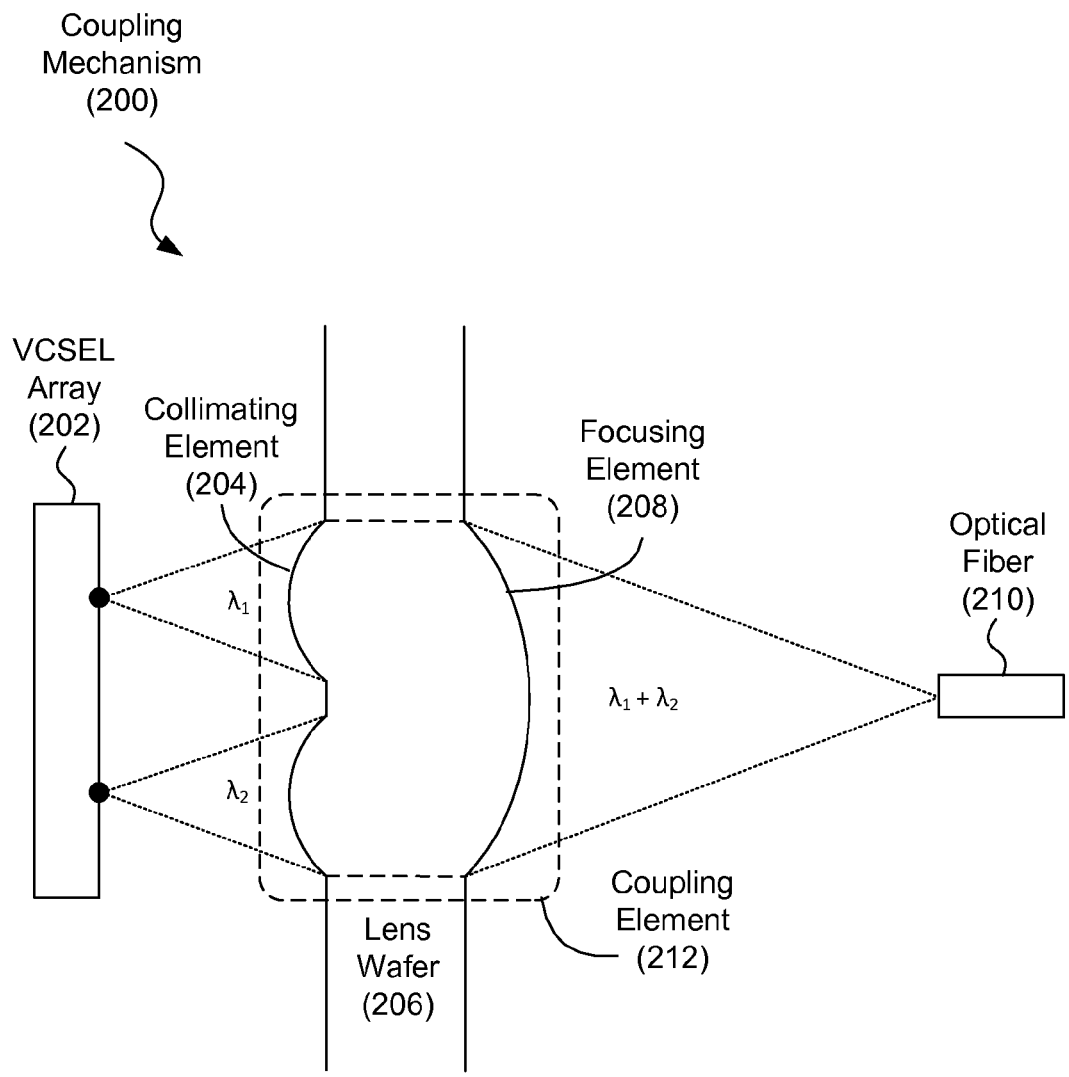
FIG. 2 is a diagram showing an illustrative coupling element on a lens wafer, according to one example of principles described herein.

FIG. 2 is a diagram showing an illustrative coupling mechanism (200) to focus light from multiple VCSELs into an optical fiber (210). According to certain illustrative examples, the coupling mechanism (200) includes a number of coupling elements (212). For illustration purposes, one coupling element (212) is shown. The coupling element (212) includes a set of collimating lenses (204) formed onto one side of a lens wafer (206) and a focusing element (208) on the other side of the lens wafer (206). The coupling element (212) acts as a multiplexer to put light of different wavelengths into the same optical fiber (210).

A lens wafer (206) is a transparent material that is able to have multiple coupling elements (212) formed thereon. Each coupling element (212) focuses light into a different optical fiber (210). A coupling element (200) will take light from multiple sources of different wavelengths and focus that light into its associated optical fiber (210). By forming arrays of these coupling elements onto a wafer in a batch process, the coupling mechanism can be produced at a lower cost.

The positioning of the coupling elements (212) on the lens wafer (206) corresponds to the positioning of the VCSELs on the VCSEL array (202). The VCSEL array may be passively aligned to the lens wafer such that the positioning of the VCSELs within the VCSEL array will project light directly into the proper coupling elements. Various techniques may be used to accomplish this precise passive self-alignment process.

Within each coupling element (212), the collimating lenses are positioned to match the positioning of a set of VCSELs within the VCSEL array (202). A beam of light emanating from a VCSEL will naturally expand outward. The collimating lenses are designed to make the expanding rays of light within the beam substantially collimated so that they travel straight through the lens wafer rather than continuing to expand outward. The collimating lenses are shown as refractive lenses in FIG. 2. However, other methods of collimation may be used such as diffractive lenses. One type of diffractive lens that may be used is a Fresnel lens.

After the collimated light passes through the lens wafer (206), the focusing element (208) will focus the collimated light from each of the collimating lenses into an optical fiber. The optical fibers can also be aligned to the focusing elements using passive self-alignment techniques.

The set of VCSELs that correspond to the set of collimating lenses (204) associated with a single coupling element (212) can each produce a different wavelength of light. In one example, the set of VCSELs associated with a single coupling element (212) may have a 20 nanometer (nm) wavelength difference between. Each different wavelength of light can carry a different channel of data. Thus, if a coupling element includes two collimating lenses, that coupling element will couple two channels of data into the associated optical fiber (210). Similarly, if a coupling element includes four collimating lenses, that coupling element (212) can couple four different channels of data into the associated optical fiber (210).

A typical VCSEL usually emits light such that the light includes about four spatial modes along one dimensional direction. These modes can often be approximated by the Hermite Gaussian functions. When referring to a beam of emitted light, the term mode refers to the number of lobes of intensity along one transverse direction within that beam. For example, if the beam included just one mode, then that beam would have a single lobe of intensity, which would typically be at the center of the beam. The intensity of that single beam typically represents a Gaussian distribution, the maximum of which is at the center of the beam. A beam that includes multiple modes includes multiple lobes of intensity along the distribution of intensity. A typical 50 micron core graded-index multimode optical fiber is able to support about 18 modes along one dimension across its core. In two dimensions across the core area, the number of supported two dimensional modes is approximately $(18)^2=324$. If each of the VCSELs emits a beam with four modes, and the fiber supports 18 modes then it is possible for many VCSELs to be coupled into a multimode fiber without incurring any fundamental loss.

Figure 3:
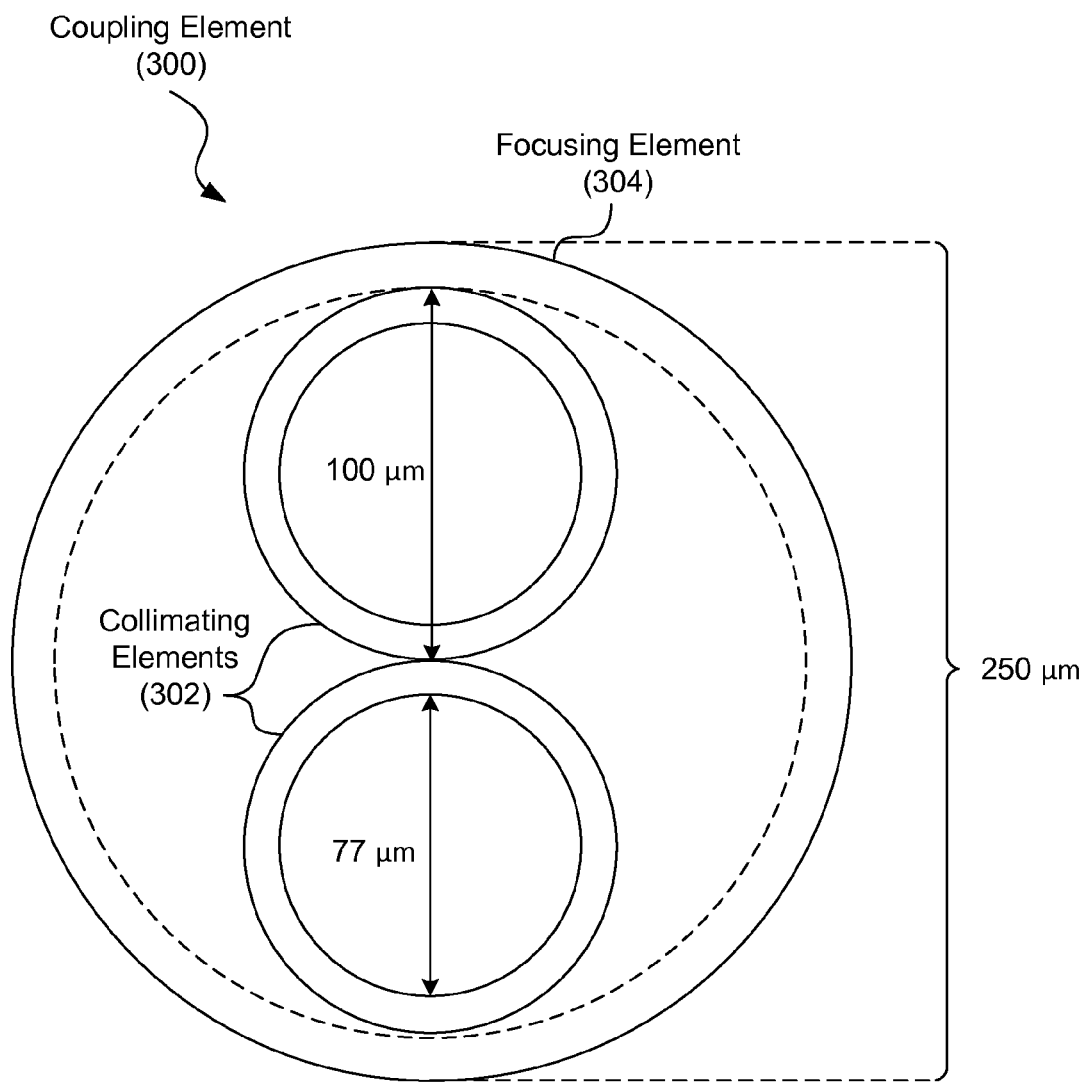
FIG. 3 is a diagram showing an illustrative direct view of a coupling element, according to one example of principles described herein.

FIG. 3 is a diagram showing an illustrative direct view of a coupling element (300) that includes two collimating lenses (302). In this example, the diameter of each collimating lens (302) is approximately 100 micrometers (μm). A beam of light projected onto the coupling element (300) may be designed to cover less than the total area of the collimating lens (302) so to avoid any loss due to beam clipping. Thus, the diameter of the beam projected onto a collimating lens (302) is approximately 77 μm. The combined diameters of both collimating lenses (302) may also be less than the diameter of the focusing element (304) on the other side of the lens wafer. In this example, the focusing element (304) has a diameter of 250 μm. Thus, the combined diameter of the collimating lenses (302) is 50 μm less than the diameter of the focusing element (304). This example illustrates how two sources can be coupled into a multimode transmission medium without incurring any fundamental loss.

Figure 4A:
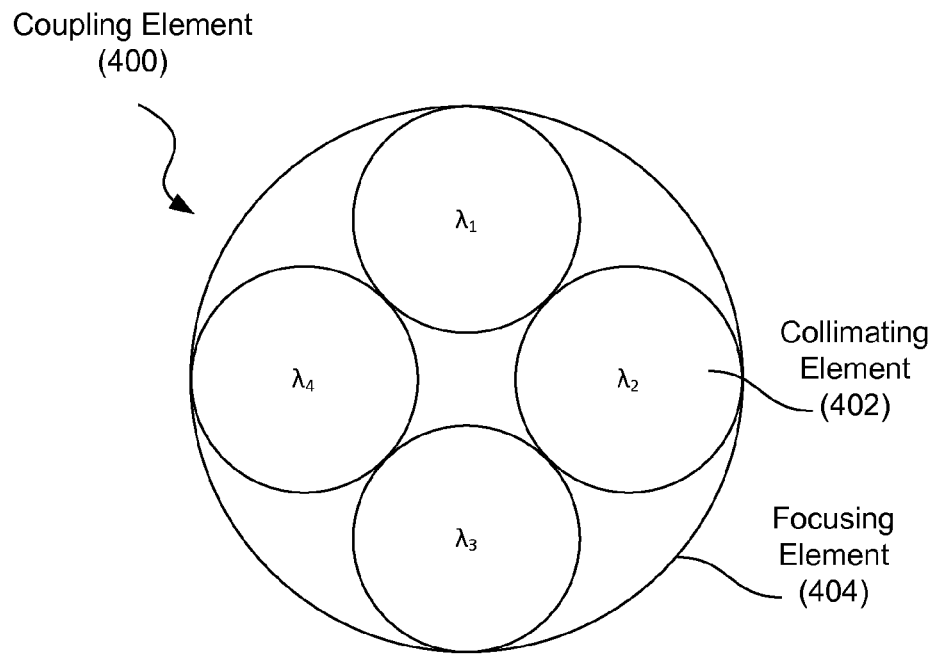
FIG. 4A is a diagram showing an illustrative direct view of a coupling element that includes four collimating lenses, according to one example of principles described herein.

FIG. 4A is a diagram showing an illustrative direct view of a coupling element (400). According to certain illustrative examples, a coupling element (400) may include four collimating lenses (402). Each collimating lens (412) will collimate light of a different wavelength and the focusing element (404) will focus light of each of those wavelengths into a single optical fiber.

Figure 4B:
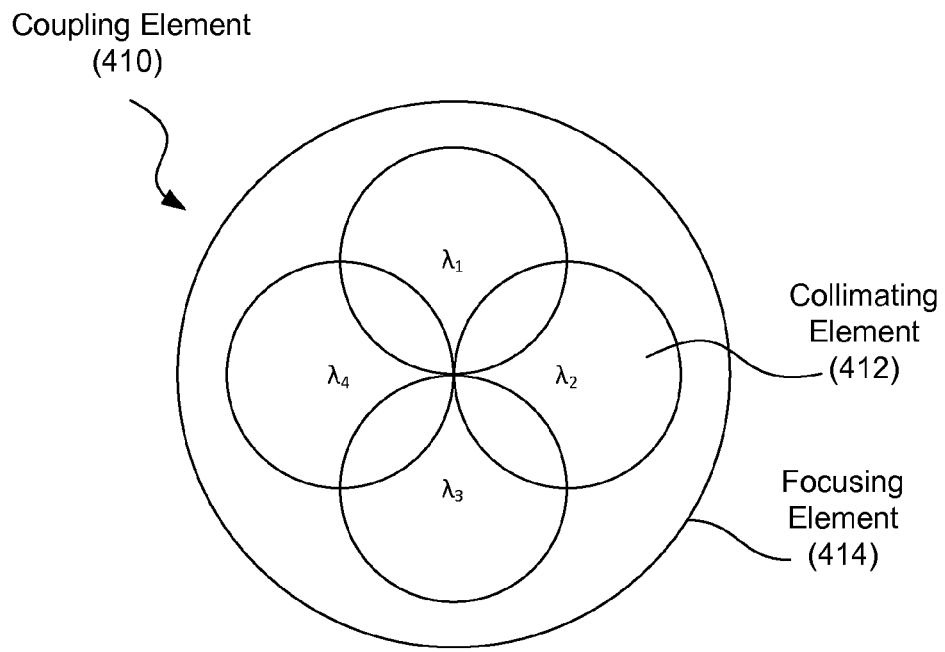
FIG. 4B is a diagram showing an illustrative direct view of a coupling element that includes four overlapping collimating lenses, according to one example of principles described herein

FIG. 4B is a diagram showing an illustrative direct view of a coupling element (410). According to certain illustrative examples, each of the collimating lenses may be slightly overlapped. Again, each collimating lens (412) will collimate light of a different wavelength and the focusing element (414) will focus light of each of those wavelengths into a single optical fiber. Although some clipping of the beams may occur due to the overlapping of the collimating lenses (412), this loss may be acceptable in order to reduce the positional tolerances of the completely assembled optical system.

As mentioned above, after the multiplexed beams of light have traveled through a fiber optic cable, the beams are separated into their respective wavelengths and then fed to separate detectors. Various methods of separating the combined beams of different wavelength may be used. According to certain illustrative examples, one way of demultiplexing the optical signals is to use a demultiplexer that employs wavelength selective mirrors.

Figure 5:
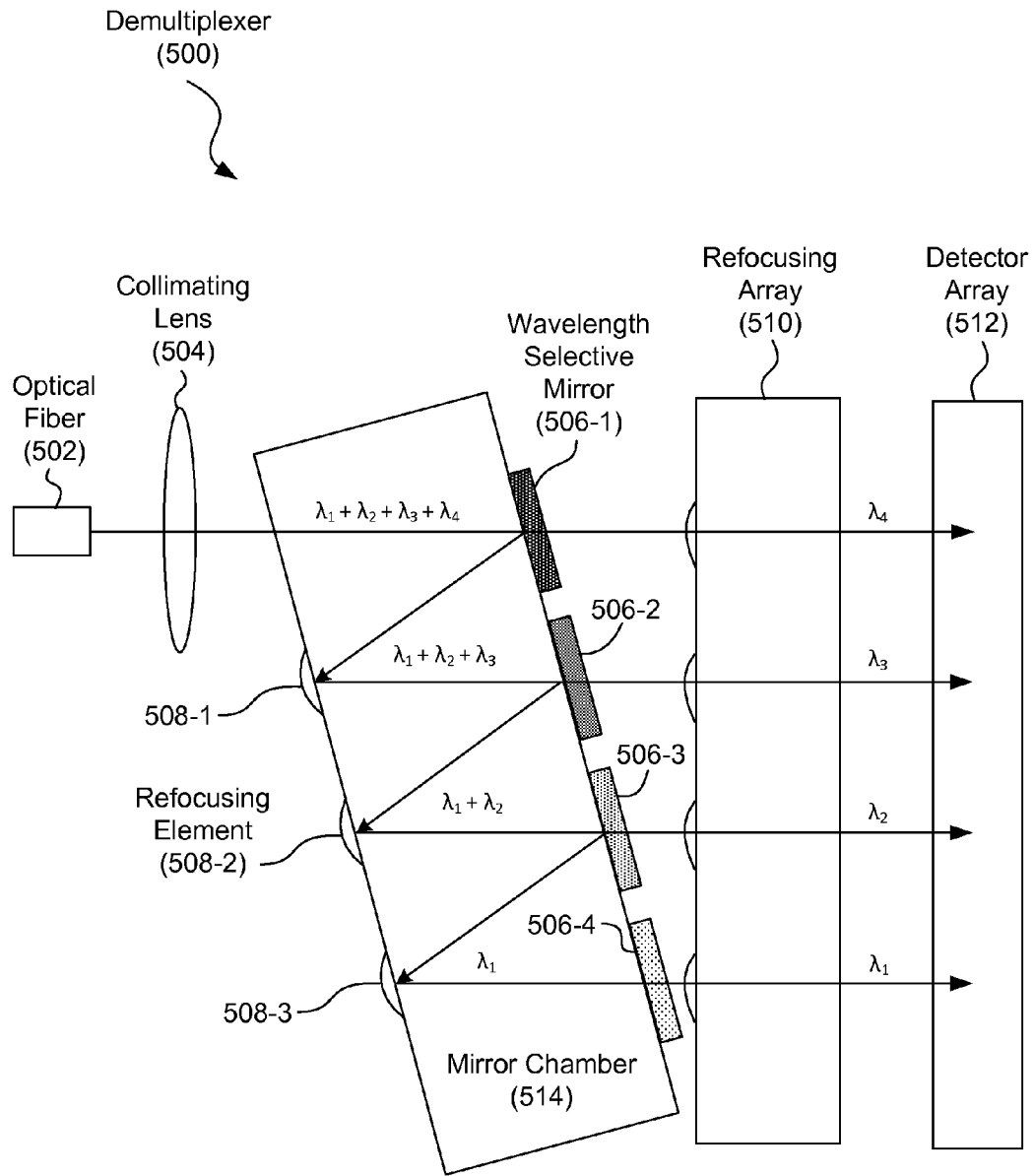
FIG. 5 is a diagram showing an illustrative demultiplexer with wavelength selective mirrors, according to one example of principles described herein.

FIG. 5 is a diagram showing an illustrative demultiplexer (500) with wavelength selective mirrors (506). According to certain illustrative examples, the demultiplexer (500) includes a set of wavelength selective mirrors (506), a set of refocusing elements (508), a focusing array (510) and a detector array (512).

A wavelength selective mirror is a material that allows light of a certain wavelength range to pass while reflecting other wavelengths. Various thin film materials may be used to form a wavelength selective mirror. Alternatively, high contrast gratings using sub-wavelength transverse features may be used to form a wavelength selective mirror. This could allow the different wavelength selective mirrors (506) to be manufactured on a single wafer using an appropriate mask design. The demultiplexer (500) may include a wavelength selective mirror for each wavelength of light multiplexed into the fiber optic cable (502). For example, if the multiplexer includes four collimating lenses, each collimating lens receiving a different wavelength of light, then the demultiplexer can include four wavelength selective mirrors.

When the light first exits the optical fiber (502), a collimating lens may be used to collimate the light before passing that light into the mirror chamber (514). The mirror chamber includes the wavelength selective mirrors positioned in such a manner so as to let one wavelength of light pass and reflect the remaining wavelengths to a refocusing element (508). The refocusing element will then reflect the remaining wavelengths of light to a subsequent wavelength mirror (506). This process will occur until each desired wavelength of light is passed through a wavelength selective mirror (506).

After a wavelength of light is passed through a wavelength selective mirror, it will be passed through a focusing array that will focus that light onto a detector of a detector array (512). The detectors within the detector array (512) can detect the light impinging thereon and create an electric signal based on the received optical signal. The electrical signal may then be processed by standard computer processing circuitry which uses electrical signals.

In the example illustrated in FIG. 5, four wavelengths of light, wavelength 1, wavelength 2, wavelength 3, and wavelength 4, enter the mirror chamber. The first wavelength selective mirror (506-1) passes wavelength 4 and reflects the rest of the wavelengths. Refocusing element 1 (508-1) then reflects the remaining wavelengths to the second wavelength selective mirror (506-2). The second wavelength selective mirror passes wavelength 3 and reflects the remaining wavelengths to refocusing element 2 (508-2). Refocusing element 2 (508-2) then reflects those wavelengths to the third wavelength selective mirror (506-3). The third wavelength selective mirror (506-3) then passes wavelength 2 and reflects wavelength 1 to refocusing element 3 (508-3). Refocusing element 3 (508-3) then reflects wavelength 1 to the last wavelength selective mirror (506-4). The last wavelength selective mirror is used to remove any unwanted wavelengths so that the detector receives light of wavelength 1. In some cases, the final wavelength selective mirror (506-4) may not be used.

In some cases, the spacing of the wavelength selective mirrors is such that the pitch of the detector array is less than the pitch of an array of optical transmission media. The pitch of the detector is defined as the distance between the first detector of one set of detectors to the first detector of an adjacent set of detectors, each set of detectors being associated with a different coupling element. The pitch of the optical transmission medium array can be measured as the distance from the center of one optical transmission medium to the center of an adjacent optical transmission medium. By making it so that the spacing between the wavelength selective mirrors is less than or equal to the pitch of an array of optical transmission medium, an array of demultiplexers (500) may better fit the array of optical transmission media from which the multiplexed light signals were received.

Figure 6:
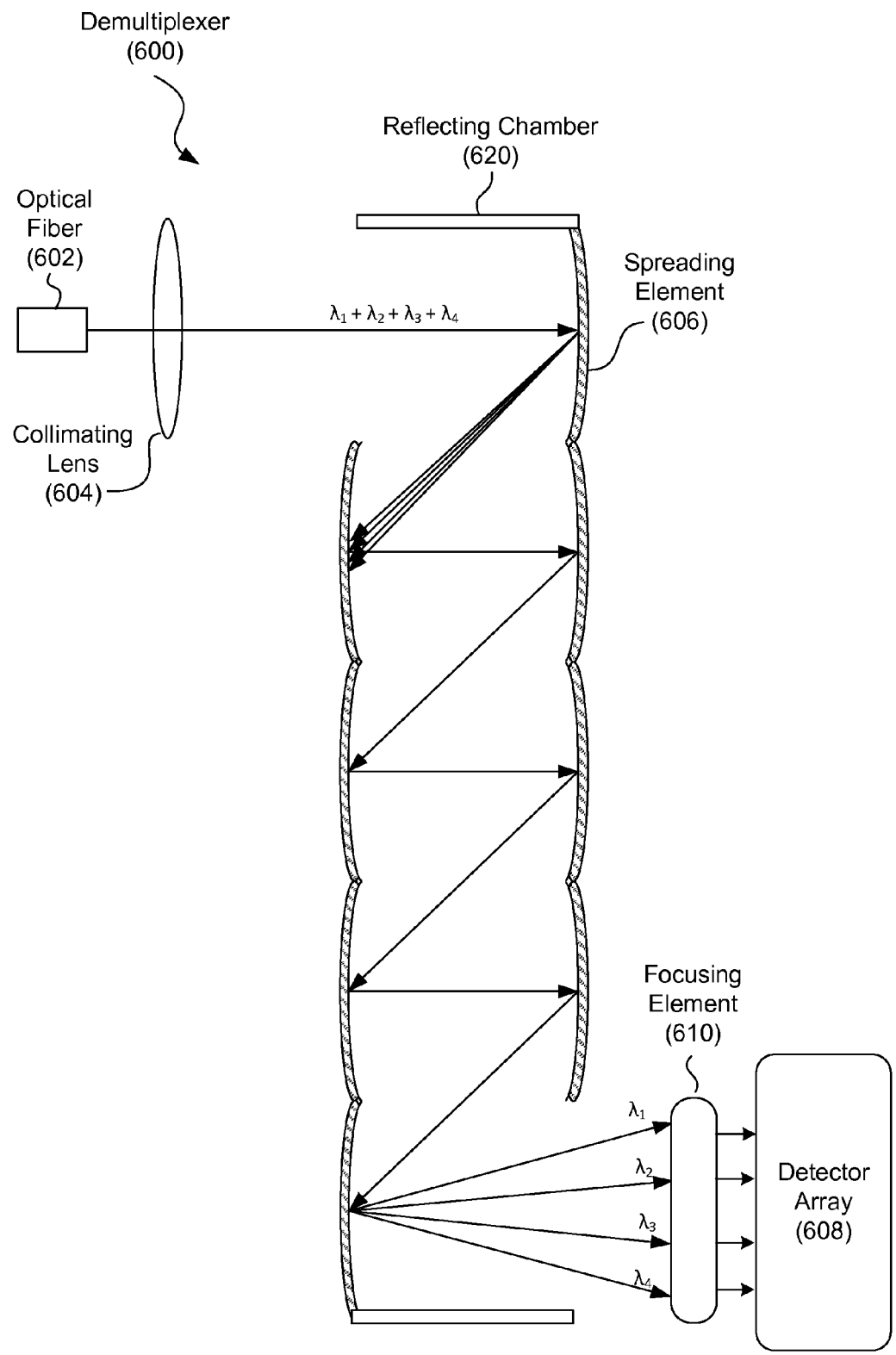
FIG. 6 is a diagram showing an illustrative demultiplexer with a series of spreading elements, according to one example of principles described herein.

FIG. 6 is a diagram showing an illustrative demultiplexer (600) with a series of spreading elements (606). According to certain illustrative examples, one way to separate the different wavelengths of light traveling through an optical fiber is to use spreading elements (504). Throughout this specification and in the appending claims, the term "spreading element" is to be broadly interpreted as an element that reflects different wavelengths of light at different angles. Thus, when light of different wavelengths impinges on a spreading element, the light reflecting from that spreading element will begin to spread according to wavelength. Spreading elements may be formed through the use of standard diffraction gratings or high contrast gratings with sub-wavelength features to increase the reflection efficiency.

According to certain illustrative examples, a demultiplexer (600) includes a reflecting chamber (620) that receives light from an optical fiber (602) through a collimating lens (604). The reflecting chamber (620) includes a number of spreading elements (606) positioned so that light is reflected back and forth between the spreading elements (606) until it is finally reflected onto a detector array (608). At each spreading element (606), the light of different wavelengths spreads farther apart. This is because each spreading element reflects light of different wavelengths at different angles.

By the time the light is reflected out of the reflecting chamber (620), the four different wavelengths of light are spread far enough such that they are projected onto a different detector within the detector array. A focusing element (610) may be used to focus the beams of light received from the reflecting chamber (620) onto the individual detectors within the detector array (608). A particular detector may receive light mostly of one particular wavelength. It may be possible that the particular detector receives light of other wavelengths as well. However, the spreading elements make it so that one particular wavelength of light is more intense than the other wavelengths. Thus, the detector can tolerate a small amount of "noise" light from the other wavelengths.

Figure 7:
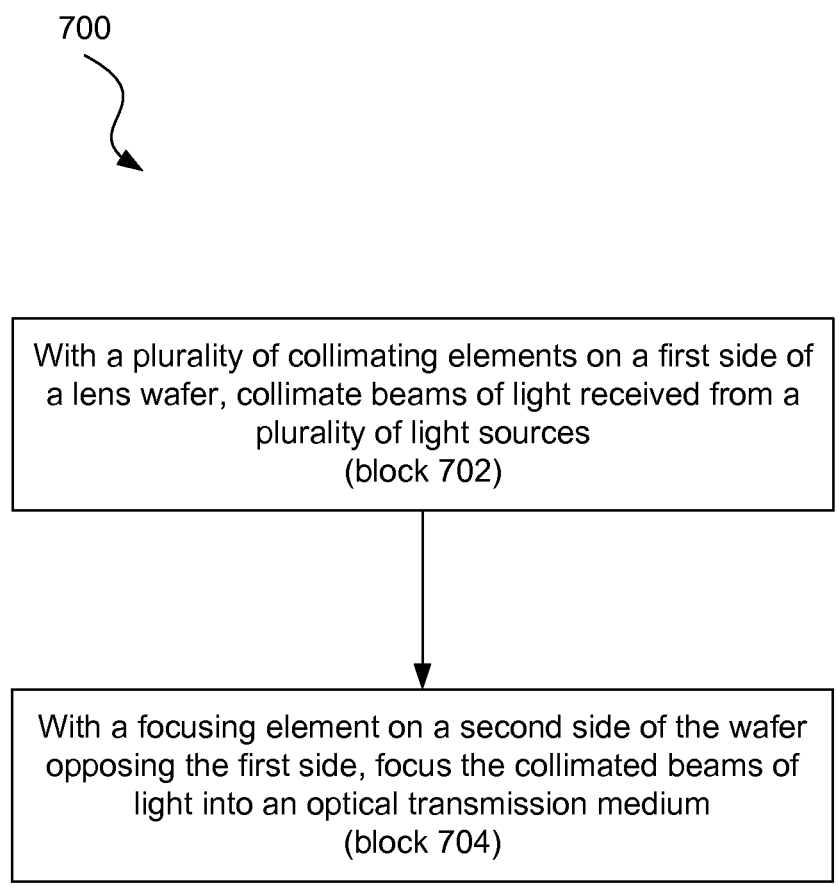
FIG. 7 is a flowchart showing an illustrative method for optical multiplexing, according to one example of principles described herein.

FIG. 7 is a flowchart showing an illustrative method (700) for optical multiplexing. According to certain illustrative examples, the method includes, with a plurality of collimating lenses on a first side of a lens wafer, collimating (block 702) beams of light received from a plurality of light sources, and with a focusing element on a second side of the wafer opposing the first side, focusing (block 704) the collimated beams of light into an optical transmission medium.

In conclusion, through use of methods and systems embodying principles described herein, coupling components can be produced at a lower cost. This lower cost is due in part to the batch processing of multiple coupling elements onto a single lens wafer. The lower cost coupling components makes optical communication methods more suitable for computer communication applications where the optical signal travels a relatively short distance.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An optical transmission system comprising:
a lens wafer to couple light into an optical transmission medium, said lens wafer comprising:
a set of collimating lenses on a first side of said lens wafer, said collimating lenses to collimate beams of light from a plurality of light sources; and
a focusing element on a second side of said wafer opposing said first side, wherein:
said focusing element is to focus said collimated beams of light into an optical transmission medium; and
a diameter of said focusing element is larger than a combined diameter of multiple corresponding collimating lenses; and
a demultiplexer on an opposing end of said optical transmission medium, said demultiplexer comprising:
a set of wavelength selective mirrors, each mirror to pass a different wavelength of light and reflect other wavelengths of light;
a set of refocusing elements to reflect light reflected from one of said wavelength selective mirrors back into other wavelength selected mirrors;
a focusing array to focus wavelengths of light passing through said wavelength selective mirror; and
a detector array to detect separate wavelengths of light passed through said wavelength selective mirrors.

2. The system of claim 1, in which said lens wafer further comprises an array of additional sets of collimating lenses, each additional set of collimating lenses corresponding to an additional focusing element on said second side of said lens wafer, each focusing element focusing light into a different optical transmission medium.

3. The system of claim 1, in which said collimating lenses are spaced such that they overlap.

4. The system of claim 1, wherein each of said plurality of light sources produces a different wavelength of light.

5. The system of claim 1, in which said wavelength selective mirrors comprises one of: dielectric thin films and high contrast gratings.

6. The system of claim 1, wherein spacing of said wavelength selective mirrors is such that each wavelength of light passed through is spaced such that the total space of the detector array to detect said wavelengths is less than or equal to a pitch of an array of optical transmission media.

7. The system of claim 1, further comprising a demultiplexer on an opposing end of said optical transmission medium, said demultiplexer comprising:
a series of spreading elements to receive light from said optical transmission medium, each of said series of spreading elements reflecting different wavelengths of lights at different angles to a subsequent spreading element; and
a final spreading element to reflect light onto a detector array.

8. A method for optical multiplexing, the method comprising:
with a plurality of collimating lenses on a first side of a lens wafer, collimating beams of light received from a plurality of light sources;
with a focusing element on a second side of said lens wafer opposing said first side, wherein:
said focusing element focuses multiple said collimated beams of light from multiple collimating lenses into an optical transmission medium; and
de-multiplexing said different wavelengths of light on an opposing end of said optical transmission medium by passing said light through a series of spreading elements to a detector array, each spreading element reflecting different wavelengths of light at different angles so that different wavelengths of light reach said detector array at different positions.

9. The method of claim 8, in which each of said plurality of light sources produces a different wavelength of light.

10. The method of claim 9, further comprising de-multiplexing said different wavelengths of light on an opposing end of said optical transmission medium by:
passing light from said optical transmission medium through a set of wavelength selective mirrors, each mirror to pass a different wavelength of light and reflect other wavelengths of light; and
reflecting said light reflected by one of said wavelength selective mirrors back to other wavelength selected mirrors;
wherein light passing through said wavelength selective mirrors is passed to a detector array.

11. The method of claim 10, in which said wavelength selective mirrors comprises high contrast gratings.

12. The method of claim 10, wherein spacing of said wavelength selective mirrors is such that each wavelength of light passed through is spaced such that the total space of the detector array to detect said wavelengths is less than or equal to a pitch of an array of optical transmission media.

13. An optical system comprising:
   an array of sets of light sources, each light source within a set projecting a different wavelength of light;
   a lens wafer comprising a number of coupling elements, each coupling element comprising:
      a set of collimating lenses on a first side of said lens wafer, said collimating lenses to collimate beams of light from said light sources; and
      a focusing element on a second side of said wafer opposing said first side, wherein:
         said focusing element is to focus said collimated beams of light into an optical transmission medium; and
         a diameter of said focusing element is larger than a combined diameter of multiple corresponding collimating lenses; and
   a demultiplexer on an opposing end of said optical transmission medium, said demultiplexer comprising:
      a set of wavelength selective mirrors, each mirror to pass a different wavelength of light and reflect other wavelengths of light;
      a set of refocusing elements to reflect light reflected from one of said wavelength selective mirrors back into other wavelength selected mirrors;
      a focusing array to focus wavelengths of light passing through said wavelength selective mirror; and
      a detector array to detect separate wavelengths of light passed through said wavelength selective mirrors.

14. The system of claim 1, wherein said set of collimating lenses are batch-formed lenses.

15. The system of claim 1, wherein said focusing element is a single focusing element to focus multiple collimated beams output from multiple of the set of collimated lenses.

16. The system of claim 1, wherein said set of wavelength selective mirrors are disposed on a single wafer substrate.

17. The system of claim 13, wherein said set of collimating lenses are diffractive lenses.

18. The system of claim 13, wherein said set of collimating lenses are Fresnel lenses.

* * * * *